Jan. 26, 1971   G. E. MOORE ET AL   3,558,163
SWIVEL CONNECTER FOR TUBING
Filed Jan. 6, 1969
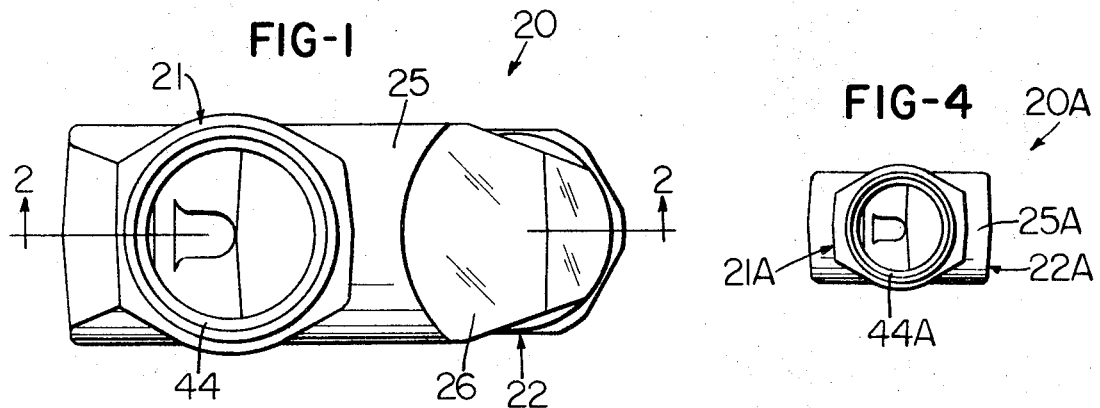
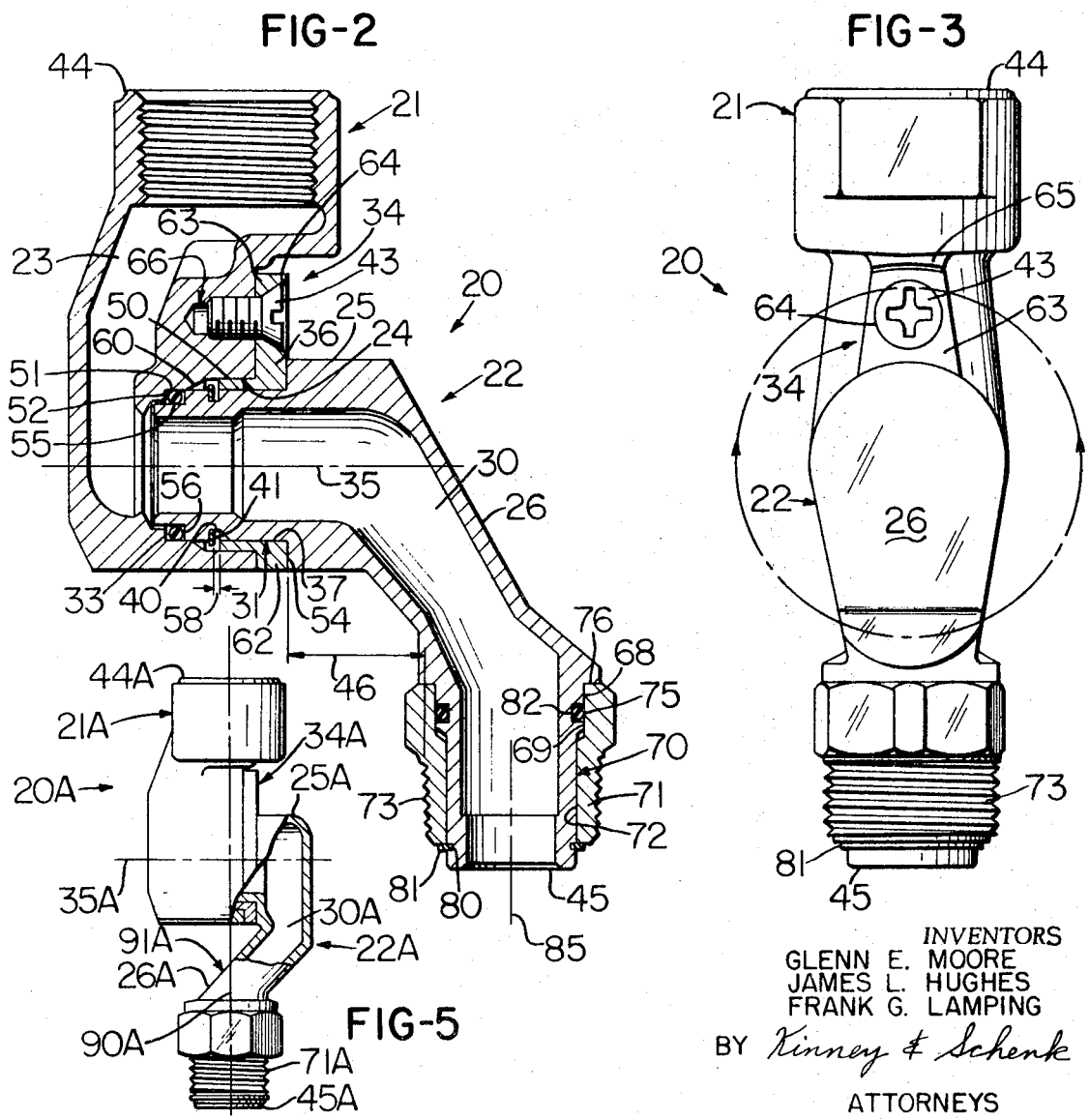
INVENTORS
GLENN E. MOORE
JAMES L. HUGHES
FRANK G. LAMPING
BY *Kinney & Schenk*
ATTORNEYS United States Patent Office 3,558,163
Patented Jan. 26, 1971

3,558,163
SWIVEL CONNECTER FOR TUBING
Glenn E. Moore and James L. Hughes, Cincinnati, Ohio, and Frank G. Lamping, Dayton, Ky., assignors to Dover Corporation, Cincinnati, Ohio, a corporation of Delaware
Filed Jan. 6, 1969, Ser. No. 789,195
Int. Cl. F16l 27/02
U.S. Cl. 285—168                                           12 Claims

ABSTRACT OF THE DISCLOSURE

A swivel connecter for tubing having an inlet portion and a substantially L-shaped outlet portion fastened to the inlet portion in a simple and economical manner wherein the L-shaped outlet portion is rotatable relative to the inlet portion about an axis common with a leg of the L-shaped outlet portion. One of the portions of the swivel connecter may also be provided with an adapter which is rotatable relative to such one portion about an axis transverse the common axis and through an angle of 360°.

BACKGROUND OF THE INVENTION

In gasoline service stations it is desirable that each gasoline dispensing nozzle be easily movable in a plurality of directions relative to its gasoline supply hose to enable easier filling of an associated gasoline tank. In particular, it has been found that more efficient alignment of each gasoline nozzle with each associated gasoline tank filler pipe can be provided by using a swivel connecter to enable moving the gasoline nozzle about two mutually perpendicular axes relative to its supply hose.

SUMMARY

This invention provides an improved swivel connecter for use with both rigid tubing and flexible tubing, which is of simple and economical construction, and which has a discharge end portion which is easily movable relative to its inlet end portion about two substantially mutually perpendicular axes.

Other details, uses, and advantages of this invention will become apparent as the following description of the exemplary embodiments thereof presented in the accompanying drawing proceeds.

BRIEF DESCRIPTION OF THE DRAWING

The accompanying drawing shows present exemplary embodiments of this invention, in which:

FIG. 1 is a plan view of one exemplary embodiment of a swivel connecter of this invention;

FIG. 2 is a cross-sectional view on the line 2—2 of FIG. 1;

FIG. 3 is a front elevation of the swivel connecter of FIG. 1 particularly illustrating the manner in which its outlet portion may be rotated through an arc of 360° relative to its inlet portion;

FIG. 4 and illustrating portions thereof in cross-section. connecter of this invention; and FIG. 5 is a side elevation of the swivel connecter of FIG. 4 and illustrating portions thereof in cross-section.

DESCRIPTION OF ILLUSTRATED EMBODIMENTS

Reference is now made to FIGS. 1–3 of the drawings wherein one exemplary embodiment of a swivel connecter of this invention is illustrated and designated generally by the reference numeral 20. The swivel connecter 20 is particularly adapted for use with a fluid dispensing nozzle such as a gasoline dispensing nozzle and enables optimum versatility in placing such nozzle within a filler pipe of an assoicated gasoline tank by enabling such nozzle to be simultaneously rotated about two substantially mutually perpendicular axes relative to an associated supply hose for the gasoline nozzle. The swivel connecter 20 comprises housing means having an inlet portion 21 and an outlet portion 22 and the inlet portion has an inlet passage 23 provided therein and roughly cylindrical female surface means designated generally by the reference numeral 24 intersecting the inlet passage 23.

The outlet portion 22 of the swivel connecter 20 is defined as a substantially L-shaped portion having an upstream leg 25, a downstream leg 26, and a roughly L-shaped fluid passage 30 extending therethrough. The upstream leg 25 has male surface means designated generally by the reference numeral 31 provided thereon and received within the cylindrical female surface means 24 to thereby place the L-shaped passage 30 in fluid flow communication with the inlet passage 23. Seal means shown in the form of an annular seal 33 is provided between the outer periphery of the upstream leg 25 and the cylindrical female surface means of the inlet portion 21 to provide a fluid-tight seal therebetween.

The swivel connecter 20 also has connecting means of simple and unique construction and designated generally by the reference numeral 34 and the connecting means 34 is provided for connecting the inlet portion 21 and outlet portion 22 together while enabling rotation of the L-shaped outlet portion about a central axis 35 through the connecter 20 and which also defines the central axis of the cylindrical female surface means 24. In this exemplary embodiment of the invention the L-shaped outlet portion 22 is rotatable relative to the inlet portion 21 through an angle of 360° and about the central axis 35.

The connecting means 34 comprises a sleeve-like bearing 36 which is supported concentrically around the upstream leg 25. The upstream leg 25 has an annular groove 40 provided therein which receives a bearing retainer 41 which may be in the form of a snap ring, or the like, which holds the bearing 36 on the upstream leg 25 against axial movement away from the inlet portion 21 with the swivel connecter 20 suitably assembled; yet, the bearing retainer 41 allows rotation of the upstream leg relative to the bearing 36. The connecting means 34 also comprises attaching means shown in this exemplary embodiment of the invention as a metal screw 43 which attaches the sleeve-like bearing 36 and hence the outlet portion 22 to the inlet portion 21.

The bearing 36 has a substantially frictionless inside surface 37 which engages the inner portion of the male surface means 31 to enable substantially frictionless rotation of the outlet portion 22 relative to the sleeve bearing 36 and hence relative to the inlet portion 21. The bearing 36 may be made of any suitable material which is compatible with the material used to make the inlet portion 21, with the material used to make the outlet portion 22, and with the fluid which will normally flow through the swivel connector 20. For example, the bearing 36 may be of a self-lubricating type such as a self-lubricating brass bearing or may have its surface 37 suitably treated with a plastic-like material, with a hard metallic finish, or the like, to enable smooth substantially friction-less rotation of the outlet portion 22 relative to the bearing 36.

The inlet end 44 of the inlet portion 21 and the discharge end 45 of the downstream leg 26 of outlet portion 22 are arranged in parallel relation and spaced by a distance as indicated at 46. Thus, it will be readily apparent from FIGS. 2 and 3 that the L-shaped outlet portion 22 may be rotated relative to the inlet portion 21 about the central axis 35 through an angle of 360° while the annular seal 33 provides a fluid-tight seal between the inlet portion 21 and outlet portion 22 to assure that there will be no fluid leakage.

The roughly cylindrical female surface means 24 comprises an outer cylindrical surface 50 which receives an associated outside surface of the bearing 36 and the female surface means 24 also has an inner sealing surface 51 which terminates in an inner shoulder 52 comprising the inlet portion 21. The inner sealing surface 51 receives the outer surface of the annular seal 33 there-against and provides a fluid-tight seal.

The upstream leg 25 of the outlet portion 22 has an annular shoulder 54 which holds the upstream leg 25 and hence the outlet portion 22 against axial movement toward the inlet portion 21 with the inlet and outlet portions of the swivel connector suitably assembled together. The bearing 36 is thus confined between the bearing retainer 41 and the shoulder 54 within predetermined tolerance limits to assure that with the metal screw 43 fastened in position the L-shaped outlet portion 22 cannot be pulled too far away from the inlet portion 21 and thereby assure that with limited axial movement designated by the reference numeral at 58 the annular seal 33 provides a fluid-tight seal.

The upstream leg 25 also has a reduced diameter cooperating sealing surface 55 defining its inner end and an annular shoulder 56 is provided on the upstream leg 25 adjoining the inner end of the cooperating sealing surface 55. Thus, it will be seen that the inner sealing surface 51 and the cooperating sealing surface 55 cooperate with the annular seal 33 to define the previously mentioned fluid-tight seal while the annular shoulder 56 in the upstream leg 25 and the inner shoulder 52 adjoining the inner sealing surface 51 cooperate to confine the annular seal 33 therebetween.

The substantially L-shaped outlet portion 22 is made in a simple and economical manner and the dimensions of the various cooperating component parts and placement of the bearing retainer 41 are such that upon moving the outlet portion 22 the previously mentioned axial distance 58 along the axis 35 the annular seal 33 remains in effective contact with the inner sealing surface 51 and the cooperating sealing surface 55 to provide the fluid-tight seal under all operating conditions and with the outlet portion 22 rotated in any desired position relative to the inlet portion 21.

The cylindrical female surface means 24 also has a substantially frustoconical surface 60 arranged intermediate the outer cylindrical surface 50 and the inner sealing surface 51. The frustoconical surface 60 may be inclined at any suitable angle relative to the central axis 35 and in this exemplary embodiment of the invention an outward flare angle of 33° is illustrated in the drawing. The frustoconical surface 60 flares outwardly so that its large diameter end adjoins the outer cylindrical surface 50 and its small diameter end adjoins the inner sealing surface 51. The frustoconical surface 60 enables smooth assembly of the outlet portion 22 with the annular seal 33 previously installed in position on the cooperating sealing surface 55 and assures that the upstream leg 25 may be inserted within the cylindrical female surface means 24 without damage to the annular seal 33 and in a manner to be described in more detail subsequently.

The sleeve-like bearing 36 may be of any suitable construction and has a roughly L-shaped cross-sectional configuration as indicated at 62. The bearing 36 also has an upwardly extending portion which will be referred to as a lug portion 63 which may have a suitable countersunk opening 64 extending therethrough. The lug 63 is received in associated recess means 65 in the inlet portion 21 and the attaching screw 43 is extended through the opening 64 and is used to attach the bearing 36 and hence the outlet portion 22 to the inlet portion 21.

In this exemplary embodiment of the invention the metal screw 43 is the sole means used to hold the inlet portion 21 and outlet portion 22 together whereby maximum economy of construction and assembly of the component parts is provided. Further, for even greater economy, the screw 43 may be in the form of a self-tapping screw which is suitably installed in a cooperating unthreaded opening 66 provided in the inlet portion 21.

The swivel connecter 20 thus has connecting means comprised of the sleeve-like bearing 36, the bearing retainer 41, and the self tapping screw 43, which are not only of simple and economical construction as individual units but also enable simple and easy assembly of the outlet portion 22 to the inlet portion 21. Such assembly is preferably achieved by preassembling the bearing 36, retainer 41, and annular seal 33 on the outlet portion 22 and then simply placing the upstream leg 25 within the cylindrical female surface means 24 and attaching the self-tapping screw 43 in position. With this technique, it will be appreciated that the bearing 36 is firmly held by the bearing retainer 41 on the outlet portion 22 and the annular seal 33 while being installed on the cooperating sealing surface 55 is simply and smoothly inserted in position because the intermediate frustoconical surface 60 assures smooth entry of the outer surface of the annular seal 33 in position against the inner sealing surface 51. Thus, it will be appreciated that there will be minimum likelihood of damage to the annular seal 33.

The outlet portion 22 of the swivel connecter 20 presented in this example of the invention and in particular the downstream leg 26 thereof has a substantially cylindrical outside surface designated generally by the reference numeral 70 and the outlet portion also has an adapter 71 which has a cooperating substantially cylindrical inside surface 72 which is rotatably supported concentrically around the cylindrical outside surface 70. Coupling means in the form of a male thread 73 is provided on the adapter 71 and the thread 73 enables coupling of the adapter 71 and hence the outlet portion 22 to an associated conduit which may be either a rigid or a flexible conduit. Member 71 has a bore 70, member 71 has a minor inside diameter 70 and a major inside diameter 69. The portion 45 has a minor outside diameter 72 and a major outside diameter 68 which cooperates with the major and minor inside diameters 70 and 69 respectively. A recess is provided in the major outside diameter 68 and receives a seal ring 75.

The outlet portion 22 also has a retaining shoulder 76 which is arranged adjacent the inner end of the outside cylindrical surface 68 and a first annular groove 80 is provided adjacent the outer end of the outlet portion 22 and receives a retaining ring 81 which may be in the form of a snap ring, or the like, therewithin. The retaining ring 81 is arranged outwardly of the adapter 71 and holds the adapter in position whereby the adapter 71 is axially confined between the retaining shoulder 76 and the retaining ring 81 while being relatively rotatable on the outlet portion 22.

The downstream leg 26 of the outlet portion 22 also has a second annular groove 82 provided therein and arranged adjacent the retaining shoulder 76. The annular groove 82 receives the sealing ring 75 therewithin to provide a fluid tight seal between the adapter 71 and the outlet portion 22. The adapter 71 is rotatable relative to outlet portion 22 about another axis 85 which is arranged substantially transverse the central axis 35 about which the inlet portion 21 and outlet portion 22 are relatively rotatable. The adapter 71 is also rotatable through an angle of 360° while the sealing ring 75 provides a fluid-tight seal between the adapter 71 and the main body of the outlet portion 22. Although the axis 85 may be arranged at any transverse angle relative to the axis 35, in this example of the invention the axis 85 is arranged substantially perpendicular to the axis 35.

From the detailed description presented above it will be appreciated that a nozzle such as a gasoline dispensing nozzle may be readily attached to the adapter 71 while the supply hose may be readily threaded within female threads provided in inlet portion 21. Thus, because of the unique manner in which the swivel connector 20 is constructed the associated gasoline nozzle may be rotated in a simultaneous manner about two substantially mutually perpendicular axes to enable insertion thereof within the inlet pipe of an associated gasoline tank and irrespective of the position or attitude of such inlet pipe. Thus, the swivel connecter 20 provides optimum versatility and enables easy filling of the gasoline tank of any motor vehicle, for example, irrespective of the manner in which a driver may part his motor vehicle alongside a gasoline pump.

The component portions of the swivel connecter 20 may be made of any suitable material and any suitable forming process may be used in order to provide maximum economy. Further, the seal means such as seals 33 and 75 may be of any suitable cross-sectional configuration and made from materials compatible with the fluid to be conveyed through the swivel connecter. In one embodiment of this invention a ring commonly referred to as a "quad-ring" has been successfully utilized to define the seal 33 and such ring is characterized by having a roughly square or rectangular cross-sectional configuration which has been found to provide optimum sealing action. It will also be appreciated that the sealing ring 75 may also be of the "quad-ring" type.

Another exemplary embodiment of this invention is illustrated in FIGS. 4 and 5 of the drawing. The swivel connecter illustrated in FIGS. 4 and 5 is very similar to the swivel connecter 20; therefore, such swivel connecter will be designated generally by the reference numeral 20A and parts of the connecter 20A which are very similar to corresponding parts of the connecter 20 will be designated by the same reference numeral as connecter 20 also followed by the letter designation A and not described again. Further, reference may be made to the previous detailed description for the various detailed component portions of the connecter 20 and such description is also fully applicable to the component portions of connecter 20A.

The only significant difference between the connecter 20A and the connecter 20 is that the outlet portion 22A of connecter 20A while also being substantially L-shaped is arranged so that the discharge end 45A of its downstream leg 26A is arranged on an axis 90A common with the inlet end 44A of inlet portion 21A yet the inlet portion 21A and outlet portion 22A may be relatively rotated about the central axis 35A through an angle of not quite 360° and in this example of the invention are relatively rotatable through an angle of roughly 240°.

However, it will be appreciated that the adapter 71A of the swivel connecter 22A may be rotated through an angle of 360° relative to the downstream leg 26A of outlet portion 22A while also enabling relative rotation of the inlet portions 21A and 22A about the central axis 35A.

The discharge end 45A of the substantially L-shaped outlet portion 26A is arranged so that it is on a common axis with the inlet end 44A of the inlet portion 21A simply by changing the configuration of the downstream leg portion 26A so that it extends through an acute angle as indicated at 91A rather than having such downstream leg arranged so that it extends substantially perpendicular to the upstream leg 25A.

The swivel connecter 20A is particularly useful in completing a fluid connection between a pair of rigid pipes, for example, which have their associated ends arranged on a common axis. Further, it will be appreciated that the swivel connecter 20A may also be used in association with a gasoline dispensing nozzle in a similar manner as described in detail in connection with the swivel connecter 20.

While present exemplary embodiments of this invention, and methods of practicing the same, have been illustrated and described, it will be recognized that this invention may be otherwise variously embodied and practiced within the scope of the following claims.

What is claimed is:

1. A swivel connecter for tubing, comprising:
an elongate inlet portion with an axial inlet opening in one end thereof and a lateral outlet opening in one side of the other end thereof, the plane of said outlet opening lying within the space bounded by the sides of said inlet opening;
an outlet portion having an inlet end and an outlet end, said inlet end and said outlet end disposed substantially perpendicularly to one another, the inlet end of the outlet portion rotatably received within the lateral outlet opening of the inlet portion;
seal means disposed between said inlet end of said outlet portion and said lateral outlet opening for effecting a seal between said inlet and outlet portions;
bearing and retainer means disposed within said lateral outlet opening in surrounding relation to said inlet end of said outlet portion for retaining said inlet end in said lateral outlet opening for relative rotation therebetween about the axis of the lateral outlet opening;
an adaptor sleeve rotatably received over the outlet end of the outlet portion for rotatably connecting the outlet portion to a fluid conduit for rotation of the outlet portion about an axis perpendicular to the axis of the lateral outlet opening;
seal means disposed between said outlet end and said adaptor sleeve for effecting a seal therebetween; and
retainer means for retaining said adaptor sleeve on said outlet end.

2. A swivel connecter as set forth in claim 1, wherein: the inlet and outlet ends of said outlet portion are connected by an angularly extending portion and said outlet end is disposed substantially coaxially with the axis of the inlet of said inlet portion.

3. A swivel connecter as set forth in claim 1, wherein: the inlet and outlet ends of said outlet portion are connected by an angularly extending portion and said outlet end is laterally offset from said axial inlet of said inlet portion with the axis thereof substantially parallel to the axis of said axial inlet.

4. A swivel connecter as set forth in claim 1, wherein said outlet end of said outlet portion has a substantially cylindrical outside surface and said adaptor sleeve has a cooperating substantially cylindrical inside surface rotatably supported concentrically around said cylindrical outside surface, said adaptor sleeve including coupling means enabling coupling thereof to an associated fluid conduit, said seal means disposed between said outlet end and said adaptor sleeve comprising a sealing ring supported between said cylindrical surfaces and said retainer means comprising a retaining ring arranged outwardly of said adaptor sleeve and holding said adaptor sleeve in position, said adaptor sleeve and outlet portion being relatively rotatable through an angle of 360° while maintaining a fluid tight seal.

5. A swivel connecter as set forth in claim 4 and further comprising a retaining shoulder on said outlet end of said outlet portion adjacent the inner end of said outside cylindrical surface, an annular groove in said outlet end adjacent the outer end of said outside cylindrical surface, said groove having a retaining ring received therewithin and said adaptor sleeve relatively rotatable on said outlet end and axially confined between said retaining shoulder and retaining ring.

6. A swivel connecter as set forth in claim 5 and further comprising: a second annular groove in said outlet end arranged adjacent said retaining shoulder, said second annular groove receiving said sealing ring therewithin.

7. A swivel connecter as in claim 1, wherein said bearing and retainer means comprises a sleeve-like bearing supported concentrically around said inlet end of said outlet portion, a bearing retainer holding said bearing on said inlet end against axial movement away from said inlet portion while enabling rotation of said inlet end relative to said bearing, and attaching means attaching said bearing to said inlet portion, said bearing and retainer means enabling free swiveling movement of said outlet portion relative to said inlet portion and said seal means providing a fluid tight seal therebetween.

8. A swivel connecter as set forth in claim 7 in which said lateral outlet opening includes a generally cylindrical female surface means, said female surface means including an outer surface receiving said sleeve like bearing, an intermediate substantially frustoconical surface and an inner sealing surface terminating in an inner shoulder, said inner sealing surface receiving said seal means thereagainst and providing said fluid tight seal.

9. A swivel connecter as set forth in claim 8 in which said inlet end of said outlet portion has a first annular shoulder holding said inlet end against axial movement toward said inlet portion and has a reduced diameter cooperating sealing surface defining its inner end, said inlet end having a second annular shoulder at the inner end of said cooperating sealing surface, and said inner sealing surface and cooperating sealing surface cooperating with said seal means to define said fluid tight seal with said second annular shoulder and inner shoulder cooperating to confine said seal means therebetween.

10. A swivel connecter as set forth in claim 9 in which said bearing, bearing retainer and seal means are provided as a preassembled unit and inserted within said female surface means of said inlet portion with said frustoconical surface means enabling smooth entry of said inlet end within said female surface means and said seal means into sealing position between said inner sealing surface and said cooperating sealing surface, said attachment means comprising a single attaching member cooperating between said bearing and said inlet portion to hold said bearing firmly in position and thereby hold said inlet and outlet portions together.

11. A swivel connecter as set forth in claim 10 in which said bearing has a lug portion extending upwardly therefrom and said attaching means comprises an opening extending through said lug portion of said bearing and an attaching screw adapted to be received through said opening and threaded in position in said inlet portion.

12. A swivel connecter as set forth in claim 11 in which said attaching screw comprises a self-tapping screw and said inlet portion has a cooperating substantially smooth opening adapted to receive said self-tapping screw therewithin, whereby assembly of said inlet and outlet portions is achieved in a simple and economical manner.

References Cited

UNITED STATES PATENTS

| | | | |
|---|---|---|---|
| 1,284,159 | 11/1918 | Sickman | 285—98X |
| 2,220,771 | 11/1940 | McHugh | 285—281X |
| 2,907,590 | 10/1959 | Oswald | 285—281X |
| 3,367,681 | 2/1968 | Braukman | 285—281X |

DAVID J. WILLIAMOWSKY, Primary Examiner

W. L. SHEDD, Assistant Examiner

U.S. Cl. X.R.
285—276, 321, 400